United States Patent Office 3,556,714
Patented Jan. 19, 1971

3,556,714
NOVEL UNSYMMETRICAL SULFONES AND METHOD OF CROSSLINKING CELLULOSIC MATERIALS THEREWITH AND REACTION PRODUCTS PRODUCED THEREBY
Giuliana C. Tesoro, Dobbs Ferry, N.Y., assignor to J. P. Stevens & Co., Inc., New York, N.Y., a corporation of Delaware
No Drawing. Filed Feb. 8, 1967, Ser. No. 614,540
Int. Cl. D06m *13/10, 13/28, 13/54*
U.S. Cl. 8—120                                7 Claims

ABSTRACT OF THE DISCLOSURE

Unsymmetrical sulfones of the structure:

(a) $\quad R'O-\underset{\underset{R'''}{|}}{CH}-CH_2-SO_2-CH_2-CH_2-OR''$ wherein R' and R" are H, alkyl groups from 1 to 5 carbon atoms, or alkanoyl groups from 2 to 6 carbons, R''' is alkyl, substituted alkyl or aryl, and (b) $\quad \underset{O}{CH_2\!-\!\!\!\!-\!\!\!\!-\!\!\!\!-\!CH}-CH_2SO_2CH_2CH_2OR''$ wherein R" is defined above.

Reaction of sulfones with cellulosic textile materials in two steps under different reaction conditions to obtain crosslinked cellulosic materials having improved crease recovery properties.

---

The present invention relates to the field of reactive unsymmetrical sulfone compounds, methods of crosslinking cellulosic textile materials with these unsymmetrical sulfones and the crosslinked textile materials obtained by said methods. In a more particular aspect, the present invention relates to unsymmetrical sulfones containing at least one beta-oxyethyl group and the methods of employing these unsymmetrical sulfones for the stepwise chemical modification of cellulosic textile materials including cellulosic fibers, yarns, fabrics and garments made therefrom.

Included among the sulfones suitable for purposes of the present invention are unsymmetrical sulfones containing two beta-oxyethyl groups and which can be represented by the generic formula:

(I) $\quad R'O-\underset{\underset{R'''}{|}}{CH}-CH_2-SO_2-CH_2-CH_2-OR''$ in which R' and R" may be hydrogen, alkyl groups containing from 1 to 5 carbon atoms or alkanoyl groups (e.g. $CH_3\overset{O}{\overset{\|}{C}}-$)

containing from 2 to 6 carbon atoms, and R''' is alkyl, substituted alkyl, or aryl.

Further among the sulfones of the present invention are epoxy sulfones having the structural formula:

(II) $\quad \underset{O}{CH_2\!-\!\!\!\!-\!\!\!\!-\!\!\!\!-\!CH}-CH_2SO_2CH_2CH_2OR''$ wherein R" has the same meaning as given above.

Unsymmetrical reactive sulfones as described in the above formulae are characterized by the presence of two functional groups of different structure and reactivity.

Unsymmetrical reactive sulfones represented by the above formulae may be used as crosslinking agents for reaction with cellulosic polymeric materials and are of particular value in stepwise and controlled reactions for the chemical modification of cellulose. The R''' group in compounds of Formula I can vary considerably and endows the sulfone reagent with specific properties while maintaining its polyfunctional reactive character.

Accordingly, it is an object of the present invention to provide a new class of stable yet reactive unsymmetrical sulfone compounds characterized by having two functional groups of different structure and reactivity and which compounds are useful for the chemical modification of cellulosic textile materials, particularly in a stepwise and controlled manner.

It is a further object of the present invention to provide a method for the stepwise and controlled participation of the functional groups of reactive unsymmetrical sulfones for the chemical modification of cellulosic textile materials.

It is a further object of the present invention to modify cellulosic materials by reaction with novel unsymmetrical sulfones so as to improve dry and wet crease recovery.

It is a further object of the present invention to provide novel polymeric materials through reaction of cellulose with unsymmetrical sulfones.

It is a further object of the present invention to provide improvements in textile materials which are lasting, durable against wear, and resistant to removal by laundering and attack by solvents.

In attaining the above objects of the present invention, one feature resides in unsymmetrical reactive sulfones containing two beta-oxyethyl groups and represented by Formula I:

I $\quad R'O-\underset{\underset{R'''}{|}}{CH}-CH_2-SO_2-CH_2-CH_2-OR''$ wherein R' and R" may be hydrogen, alkyl or carbon acyl groups and R''' may be alkyl, substituted alkyl or aryl. As the term beta-oxyethyl is used herein it is intended to include beta-hydroxyethyl, beta-alkoxyethyl, such as methoxyethyl, ethoxyethyl and 2-(isopentyloxy) ethyl and beta-acyloxyethylo e.g. 2-acetoxyethyl, 2-propionyloxyethyl and 2-(pivaloyloxy)ethyl. Thus, examples of R' and R" are alkyl groups containing from 1 to 5 carbon atoms and saturated aliphatic carbon acyl groups containing 2 to 6 carbon atoms. Examples of R''' include alkyl from 1 to 20 carbon atoms, chlorine and bromine substituted lower alkyl (1–5 carbons), phenyl and the like.

The following table shows illustrative unsymmetrical beta-oxyethyl sulfones which are encompassed in Formula I and which are useful for the stepwise modification of cellulose textile materials in accordance with the teachings of the present invention.

TABLE I

| Item | R' | R'' | R''' | Reference to examples, or name of unsymmetrical 2-oxyethyl sulfone (I) |
|---|---|---|---|---|
| (a) | H | H | $-C_2H_5$ | Made in Example 1; applied in Example 6. |
| (b) | H | H | $-CH_3$ | Made in Example 2; applied in Example 7. |
| (c) | H | H | $-C_6H_5$ | Made in Example 3; applied in Example 8. |
| (d) | H | H | $-CH_2Cl$ | Made in Example 4. |
| (e) | H | $-C_2H_5$ | $-C_{18}H_{37}$ | 1-(2-ethoxyethylsulfonyl)-2-eicosanol. |
| (f) | H | $-\overset{\overset{O}{\|}}{C}CH_3$ | $-CH_2Br$ | 1-(2-acetoxyethylsulfonyl)-3-bromo-2-propanol. |
| (g) | $-CH_3$ | $-CH_3$ | $-C_6H_{13}$ | 2-methoxyethyl 2-methoxyoctyl sulfone. |
| (h) | $-\overset{\overset{O}{\|}}{C}C_2H_5$ | $-\overset{\overset{O}{\|}}{C}C_2H_5$ | $-C_6H_5$ | Alpha-[(2-hydroxyethylsulfonyl) methyl)]-benzyldipropionate |

Beta-oxyethyl unsymmetrical reactive sulfones conforming to Formula I may be conveniently prepared by oxidation of the corresponding unsymmetrical sulfide using an oxidizing agent to produce the corresponding unsymmetrical sulfoxide as an intermediate. Hydrogen peroxide is a convenient source of oxygen for this purpose. The second oxidation step also employs an oxidizing agent such as hydrogen peroxide to produce the desired sulfone. This is shown in Equation 1 below wherein all substituents have the meaning previously given.

(1)
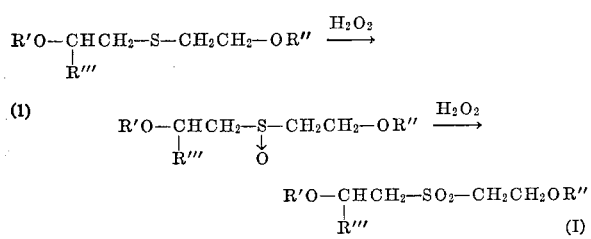

It is noted that the mercaptoethanol may be used or an ether or ester of it to produce the corresponding ether or ester form of the sulfide, i.e. R'' may be hydrogen in which case the mercaptoethanol is used; alkyl in which case an ether of mercaptoethanol is used; or alkanoyl in which case an ester of mercaptoethanol is used. The reaction represented by Equation 2 can take place under various conditions. For example, the epoxy compound can be added to the mercapto compound at around 100° C. without a catalyst as illustrated in Example 4 hereinafter. Alternately, the reaction can take place at 20–50° C. in the presence of a catalytic amount of sodium as illustrated in Examples 1, 2 and 3.

The following Table II shows the various reactants which may be used in the reaction shown by Equation 2.

a mono-substituted ethylene oxide and 2-mercaptoethanol which is shown below in Equation 2:

(2)
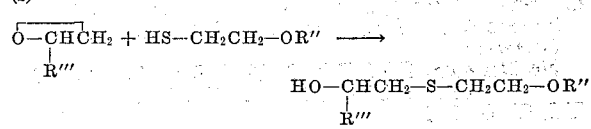

Table II

| Item | Reactant 1 | Reactant 2 | Subsequent treatment, if any, other than oxidation |
|---|---|---|---|
| (a) | 1,2-epoxybutane | 2-mercaptoethanol | |
| (b) | propylene oxide | 2-mercaptoethanol | |
| (c) | (epoxyethyl) benzene. | 2-mercaptoethanol | |
| (d) | epichlorohydrin | 2-mercaptoethanol | |
| (e) | 1,2-epoxyeicosane | 2-ethoxyethanethiol | |
| (f) | epibromohydrin | 2-mercaptoethyl acetate | |
| (g) | 1,2-epoxyoctane | 2-methoxyethanethiol or 2-mercaptoethanol | Methylation, as by dimethyl sulfate |
| (h) | (epoxyethyl) benzene | 2-mercaptoethanol or its propionate | Esterification by propionic acid. |

When hydrogen peroxide is used, as for example, in the form of a 35% solution in water, the initial oxidation step may be carried out at room temperature using a quantity sufficient to form the intermediate sulfoxide. Thereafter, in order to convert the sulfoxide to the desired unsymmetrical beta-oxyethyl sulfone, the reaction mixture resulting from the first stage of the oxidation is heated to boiling, generally under a reflux condenser and the remaining quantity of 35% aqueous hydrogen peroxide theoretically required is added in portions. Heating at reflux temperature is continued until no peroxide remains as shown by testing with potassium iodide. This may require several hours. In order to facilitate this procedure it is advantageous to avoid using an excess of hydrogen peroxide or to use a slightly less amount. However, at some times it is preferable to use the oxidizing agent in an excess and to destroy the excess by introducing a mild reducing agent such as sodium sulfite after a sufficient time has been allowed to form the desired sulfone in substantially quantitative amounts.

Unsymmetrical beta-oxyethyl sulfides which are used as the starting material for the oxidation process described above may be obtained conveniently by the addition of Further included among the novel unsymmetrical reactive sulfones of the present invention are the epoxy sulfones which have the structural formula:

II
$$CH_2\!-\!\!\!-\!\!\!-\!CH\!-\!CH_2SO_2CH_2CH_2OR''$$
$$\diagdown\!O\!\diagup$$

wherein R'' is defined as in Formula I.

The epoxy sulfone can be made, for example, by the reaction of epihalohydrin with a mercaptoethanol as is shown in Equation 3 below:

(3)
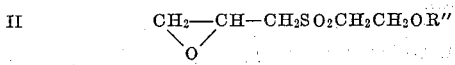
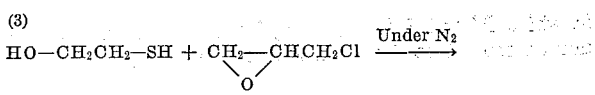

This sulfone is 2-(2,3-epoxypropylsulfonyl)-ethanol.

In accordance with another feature of the present invention, the unsymmetrical reactive sulfone compounds may be used for the chemical modification and the crosslinking of cellulosic materials. Sulfone compounds described above are characterized by having two functional groups, each different in structure and different in reactivity from the other. Because of their unsymmetrical structure all of these reactive sulfone compounds are suitable as crosslinking reagents in reactions in which the stepwise and controlled participation of the function groups is desirable. The reaction conditions in the first step are usually different from the reaction conditions in the second step and, moreover, the reaction conditions may be changed so that only one of the functional groups is reactive with the cellulosic molecules under that set of conditions.

In the case of the unsymmetrical beta-oxyethyl sulfones of Formula I which are characterized by having two activated beta-oxyethyl groups, each different in structure and reactivity from the other, elevated temperatures in the range of 80 to 165° C. are required to effect reaction of either beta-hydroxyethyl or beta-alkoxyethyl groups with cellulose. The reaction is base catalyzed and for purposes of this invention, the base or alkaline catalyst is sufficiently strong enough so that its 1% aqueous solution has a pH of at least 8. Suitable bases include alkaline salts of weak acid such as the carbonates, bicarbonates, acetates and phosphates of the alkali metals, namely, lithium, sodium and potassium; alkali hydroxides including those of lithium, sodium and potassium; and the quaternary ammonium hydroxides such as benzyltrimethylammonium and tetramethylammonium hydroxides.

In the course of the reaction which is a condensation reaction, water or an alcohol or a combination of them is eliminated. The condensation product is a modified celluose of the saturated type. When R' or R" or both are acyl groups, the reaction may readily be carried out at 15–35° C. in the presence of an equivalent amount of base such as sodium hydroxide. The reaction showing the preparation of a chemically modified but uncrosslinked cellulose is shown in the following equation:

(4)

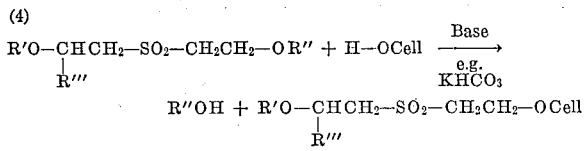

In the second stage, another cellulose molecule reacts with the R' on the other side of the sulfone compound containing the R''' group and said reaction is effected in the presence of a base catalyst, the selection of appropriate catalyst depending upon the R' constituent. The following equation depicts the second step of the reaction whereby a crosslinked cellulose material is obtainable.

(5)

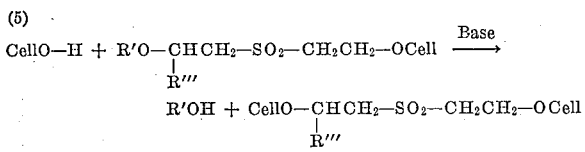

Generally, when R' or R" is H or alkyl, the second step reaction depicted immediately above requires higher temperatures such as from about 165° to 200° C. and/or stronger base such as a catalytic amount of sodium carbonate depending also on the specific nature of the R''' group.

The epoxy sulfone compounds of the present invention, such as 2-(2,3-epoxypropylsulfonyl)ethanol, are also suitable for a two-step crosslinking reaction with cellulosic material. The epoxy group of these compounds is reactive with the cellulosic hydroxyl groups in the presence of an acid catalyst. Suitable acid catalysts are magnesium chloride, zinc nitrate and zinc tetrafluoroborate, $Zn(BF_4)_2$. With the latter catalyst, the preferred temperature range is 120 to 180° C., a few minutes being required at the lower temperature, and several seconds being required at the higher end of the range.

The addition reaction is depicted in the following equation in which a modified cellulose is produced.

(6)

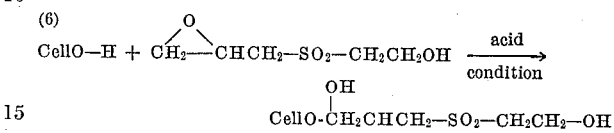

Cellulose which has been chemically modified in the manner described above can thereafter be crosslinked by using an anhydrous alkaline reaction system at elevated temperature, for example, 80 to 150° C. Water is eliminated in the crosslinking reaction which is represented by the following equation:

(7)

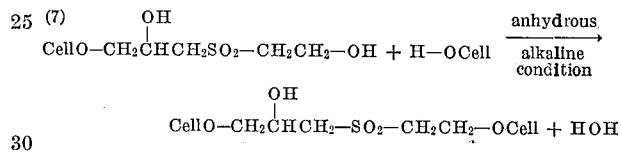

The stepwise and controllable participation of the functional groups of the unsymmetrical reagents described herein for the chemical modification of cellulosic textiles is extremely important and advantageous for it enables various other treating or manufacturing steps to be interposed between the initial chemical modification (first reaction step) and the final curing or setting of the desired configuration in the ultimate product (second reaction step). For example, cotton or rayon fabric when treated with an unsymmetrical sulfone compound and reacted under suitable conditions in the first step undergoes a chemical modification to attach the crosslinking agent to the cellulosic molecule. The chemically modified product is stable to washing, attack by solvents and handling and can be dyed by conventional methods. Thereafter, the modified fabric can be treated with an appropriate catalyst and be tailored into garments or other articles such as drapes, sheets and the like and thereafter pressed and cured to set a desired configuration such as creases, pleats and the like. Because the cellulosic fabric is crosslinked, the resulting textile product maintains the desired configuration including sharp creases and recovery from wrinkles through numerous cycles of wear or service, laundering and drying.

The attributes of the products treated in accordance with the present invention have been described by a number of expressions. Illustrative of those applicable to the resulting textile article having shape retention depending upon whether garments or other articles are involved upon the particular results achieved include minimum care, wrinkle resistant, crease resistant, no-iron, permanently ironed, flat-drying, wash and wear, permanent set, permanent pleat, permanent press, durable press and built-in press.

Cellulose may be chemically modified and crosslinked in accordance with the present invention in a variety of forms. The novel unsymmetrical reactive sulfones of the present invention are applicable as crosslinking agents for cellulose principally in textile forms whether woven or not woven, e.g. bonded or knit wear, yarns, fibers and filaments. In addition, cellulose-containing textiles are suitable which comprise both blended yarns and fabrics containing a significant proportion, for example, approximately 20% or more by weight of cellulose and textiles of 100% cellulose. Cellulosic textiles include those made from (a) seed hairs, e.g. cotton, (b) bast fibers such as flax (linen) ramie, jute and hemp, and (c) those of other sources including regenerated cellulose such as rayon, modified rayon and the like.

As referred to above, the present invention is particularly suitable for fabrics whose fibers are wholly cellulosic. Although the degree of improvement is less pronounced when the cellulose content is less than 100%, the invention is applicable to fiber blends and woven mixtures in which up to about 80% of the fibers are of the non-cellulosic type. Various synthetic fibers such as polyesters, polyamides, polyolefins, acrylics or triacetate types as well as copolymeric types as modacrylic, saran and nytril fibers are suitable. Furthermore, the textile may be in one or various states, e.g. gray, bleached or dyed.

Cellulose may be in other forms such as partially substituted cellulose and regenerated cellulose such as viscose rayon, cuprammonium rayon and cellulosic film. For such forms, wood may serve as the source. Paper is illustrative of still another form. Moreover, cellulose in the dissolved state is capable of undergoing reactions of this invention, although in general the invention applied primarily to cellulose in the solid form.

The following examples will serve to illustrate the present invention:

EVALUATION TEST METHODS

*Crease Recovery* angle in degrees, total of crease recovery angles in warp and filling directions. Monsanto method, ASTM D–1295–60T.

*Tear Strength* in pounds, Elmendorf method ASTM D–1424–59.

*Tensile Strength* in pounds, ravel 1-inch strip method, Federal Specifications for Textile Test Methods, CCC–T–191–b, Method 5104.1.

Fabric samples were conditioned and tested with the relative humidity (RH) at 65% and the temperature at 21° C.

In the examples which follow, all parts and percentages are by weight, unless otherwise noted.

The following abbreviations are used:

OWB.—On the weight of the bath, i.e., based on the total weight of the homogeneous liquid mixture used in a processing step. For instance, "percent OWB" is used to express the *concentration* of an ingredient in the solution used for impregnating samples of fabric.

OWF.—On the weight of fiber (or fabric), i.e., based on the weight of pre-impregnated (pre-padded) fabric. For instance, the percentage of solids OWF means the add-on expressed as percentage on the *dry* basis.

WPU.—Wet pick-up, i.e., the wet add-on (usually expressed in percentage OWF) which is the gain from solution penetrating the fabric, measured immediately after padding. As used herein, padding consists of the dual process of impregnating the fabric by passing it through a pad bath and then passing the wet fabric through squeeze rollers or wringers.

When measured in percent, the foregoing terms have the following relationship:

(Percent OWB) multiplied by $\dfrac{\text{(percent WPU)}}{100\%}$

= (percent OWF)

Other abbreviations, not related to the foregoing ones, are:

F: Filling (direction)
W: Warp (direction)

EXAMPLE 1

Preparation of 1-(2-hydroxyethylsulfonyl)-2-butanol

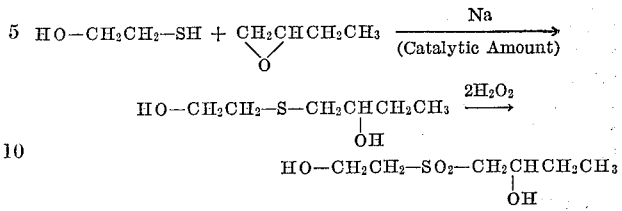

2-mercaptoethanol (78 grams, 1 mole) was added dropwise during a 25-hour period to a stirred mixture kept at 35 to 45° C. consisting of 72 grams (1 mole) of 1,2-epoxybutane and 0.5 gram of sodium. The reaction mixture was stirred for 1 hour longer. Then a 1-normal solution of hydrogen chloride in 1,2-dimethoxyethane was added to neutralize the mixture. Salt was removed by filtration, and the filtrate was distilled at reduced pressure in order to purify the intermediate product, 1-(2-hydroxyethylthio)-2-butanol. That sulfide was collected at 115 to 116° C. at a pressure of 1.5 mm. of mercury; yield, 82%.

*Analysis.*—Required by $C_6H_{14}O_2S$ (percent): S, 21.35. Found (percent): S, 21.5.

Next, by means of 35% aqueous hydrogen peroxide, used in stoichiometric amount and in the presence of phosphoric acid, the sulfide was oxidized to the corresponding sulfone, namely, 1-(2-hydroxyethylsulfonyl)-2-butanol.

*Analysis.*—Required by $C_6H_{14}O_4S$ (percent): S, 17.55. Found (percent): S, 17.4.

This crosslinking agent for cellulose was found to increase the crease recovery of cotton fabric (see Example 6).

EXAMPLE 2

Preparation of 1-(2-hydroxyethylsulfonyl)-2-propanol

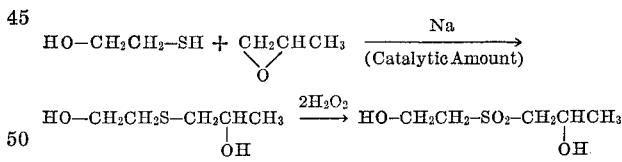

2-mercaptoethanol (78 grams, 1 mole) was added dropwise to a stirred mixture kept slightly below 30° C. consisting of 58 grams (1 mole) of propylene oxide and 0.5 gram of sodium. Upon completion of the dropwise addition, no unreacted mercapto compound remained, based on a titration test with iodine. The mixture was neutralized by means of hydrogen chloride dissolved in 1,2-dimethoxyethane. Salt was removed by filtration, and the filtrate was distilled at reduced pressure in order to purify the intermediate product, 1-(2-hydroxyethylthio)-2-propanol. That sulfide was collected at 102 to 103° C. (0.3 mm.); yield, 88%.

*Analysis.*—Sulfide S by titration with sodium hypochlorite: Found: 25.2%; required by $C_5H_{12}O_2S$, 23.5%.

Then by means of a 35% aqueous solution of hydrogen peroxide (in slightly deficient amount) in the presence of phosphoric acid, the sulfide was oxidized to the corresponding sulfone, namely 1-(2-hydroxyethylsulfonyl)-2-propanol, $C_5H_{12}O_4S$. The aqueous reaction solution of this crosslinking agent for cellulose was used for application on cotton fabric. (See Example 7, wherein crease recovery was improved.)

EXAMPLE 3

Preparation of alpha-[(2-hydroxyethylsulfonyl)-methyl]benzyl alcohol

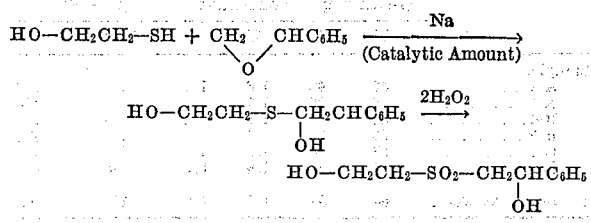

2-mercaptoethanol (78 grams, 1 mole) was added dropwise to a stirred mixture consisting of 126 grams (1 mole) of (epoxyethyl)benzene and 2 grams of sodium. After the addition had been completed, the reaction mixture was stirred for an additional 1.5 hours, by which time no unreacted mercapto compound remained, as shown by a titration test with iodine. The mixture was neutralized by means of hydrogen chloride dissolved in 1,2-dimethoxyethane. Salt was removed by filtration, and the filtrate was distilled at reduced pressure in order to purify the intermediate product, alpha-[(2-hydroxyethylthio)methyl]benzyl alcohol, $C_{10}H_{14}O_2S$. That sulfide was collected at 152–154° C. (1.2 mm.).

By means of a 35% aqueous solution of hydrogen peroxide (in slightly deficient amount), the sulfide was oxidized to the corresponding sulfone, namely alpha-[(2-hydroxyethylsulfonyl)methyl]benzyl alcohol, which crystallized; melting point, 120 to 123° C.

Analysis.—Required by $C_{10}H_{14}O_4S$ (percent): S, 13.90. Found (percent): S, 13.69.

This cellulose crosslinker was applied to cotton to increase recovery. (See Example 8.)

EXAMPLE 4

Preparation of 1-(2-hydroxyethylsulfonyl)-3-chloro-2-propanol

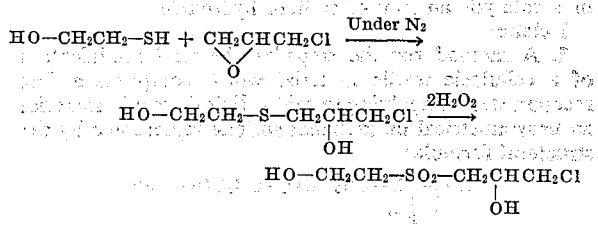

Epichlorohydrin (46.2 grams, 0.5 mole) was added at a rate of 6 ml. per minute to 39 grams (0.5 mole) of 2-mercaptoethanol kept at 90 to 100° C. under a blanket of nitrogen, following a technique described in the book, "Epichlorohydrin," Shell Chemical Co., pages 31 to 33. Upon completion of the addition, no unreacted mercapto compound remained, as shown by a titration test with iodine. The adduct, 1-(2-hydroxyethylthio)-3-chloro-2-propanol, was distilled forthwith at reduced pressure and collected at 154 to 155° C. (1.3 mm.).

Analysis.—Required by $C_5H_{11}ClO_2S$ (percent): Cl, 20.8; S, 18.8. Found (percent): Cl, 22.1; S, 18.0.

Finally, by means of a 35% aqueous solution of hydrogen peroxide (in slightly deficient amount), the sulfide was oxidized to the corresponding sulfone, namely 1-(2-hydroxyethylsulfonyl)-3-chloro-2-propanol, which, after volatilization of water, was obtained as a liquid.

Analysis.—Required by $C_5H_{11}ClO_4S$ (percent): Cl, 18.7. Found (percent): Cl, 15.8.

This halogenated sulfone having dissimilar vinyl-generating radicals is a cellulose crosslinking agent.

EXAMPLE 5

Preparation of 2-(2,3-epoxypropylsulfonyl)ethanol

The above epoxy sulfone compound,

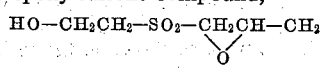

is prepared by carrying out the sequence of reactions shown in the preceding Example 4 to obtain 1-(2-hydroxyethylsulfonyl)-3-chloro-2-propanol. The latter is then converted to the epoxy sulfone by using an equivalent amount of sodium hydroxide to condense out the hydrochloric acid.

EXAMPLE 6

Modification of cellulose by 1-(2-hydroxyethylsulfonyl)-2-butanol

Samples of plain-weave cotton fabric, commonly known as 80 x 80 print cloth, were conditioned at a relative humidity (RH) of 65% and were weighed on an analytical balance. The cotton samples were treated with an aqueous solution, 20% of which was 1-(2-hydroxyethylsulfonyl)-2-butanol, and 22% of which was potassium bicarbonate (all percentages by weight), using a laboratory padder, with rolls set to give a wet pickup of 112%, as indicated in the following table. Hence, the reagent (product of Example 1) was applied at 22.4% OWF. The ratio of the sulfone (molecular weight 182, with two vinyl-generating radicals) to bicarbonate (molecular weight 100) was so chosen in this example that for each vinyl-generating radical there was one molecule of bicarbonate. That is, there was 1.0 equivalent weight (100 grams) of potassium bicarbonate per equivalent weight (91 grams) of sulfone in this example.

The fabric samples so treated were framed and dried at 60° C., then reacted in duplicate for 3 minutes at approximately (1) 150° C. or (2) 163° C.

The above samples which had been processed using 1.0 equivalent weight of potassium bicarbonate per vinyl-generating radical, were desigisated as samples A–1 and A–2, the numbers indicating the reaction temperature, 150° C. and 163° C., respectively. Two other samples were processed using 0.5 equivalent weight of potassium bicarbonate per vinyl-generating radical. Those samples were designated as samples B–1 and B–2. Furthermore, a control sample C was made with the same concentration of potassium bicarbonate as for the B samples, but no sulfone was used. For sample C, reaction conditions were 3 minutes at 163° C.

Then the samples were washed, dried in frames in a forced-draft oven, conditioned at 65% RH to bring the cotton to a state of a constant equilibrium percentage of moisture, and weighed on an analytical balance.

The following results were obtained:

| | Percent OWB | | | Reacted for 3 minutes | Tensile strength, lb. (1-inch strip) | | Tear strength, lb. (Elmendorf) | | Crease recovery angle; degrees (W+F) | |
|---|---|---|---|---|---|---|---|---|---|---|
| | Reagent | KHCO₃ | Percent WPU | temp., °C. | W | F | W | F | Dry | Wet |
| Sample: | | | | | | | | | | |
| A–1 | 20 | 22 | 112 | 150 | 50 | 34 | 1.3 | 0.8 | 160 | 191 |
| A–2 | 20 | 22 | 112 | 163 | 47 | 34 | 1.3 | 0.8 | 166 | 181 |
| B–1 | 20 | 11 | 102 | 150 | 49 | 36 | 1.3 | 0.8 | 187 | 203 |
| B–2 | 20 | 11 | 102 | 163 | 45 | 32 | 1.2 | 0.7 | 169 | 191 |
| C | None | 11 | 100 | 163 | 53 | 40 | 1.5 | 1.0 | 167 | 163 |
| Untreated control | | | | | 62 | 39 | 1.6 | 1.0 | 161 | 142 |

The samples listed above were treated in the second reaction step with additional amounts of potassium bicarbonate, dried and subsequently pressed in a creased configuration and cured. A further improvement in crease recovery and excellent retention of the crease after-laundering were obtained.

EXAMPLE 7

Modification of cellulose by 1-(2-hydroxyethylsulfonyl)-2-propanol

Samples of plain-weave cotton fabric (80 x 80 print cloth) were conditioned, weighed, and padded by following, in general, the procedure of Example 6 except that 1-(2-hydroxyethylsulfonyl)-2-propanol was used instead of 1-(2 - hydroxyethylsulfonyl) - 2 - butanol, and experimental details were as shown in the following table. This time the reagent was the product of Example 2, applied at 19.2% OWF when 0.25 equivalent of potassium bicarbonate was used per equivalent of sulfone, and at 20.0% OWF when 0.50 equivalent of potassium bicarbonate was used per equivalent of sulfone. Samples were framed, dried, reacted, washed, re-dried on frames, conditioned, weighed, and tested as in Example 6.

|  | Tensile strength, lb. (1-inch strip) | | Tear strength, lb. (Elmendorf) | | Crease recovery angle degrees (W + F) | |
|---|---|---|---|---|---|---|
|  | W | F | W | F | Dry | Wet |
| Sample: | | | | | | |
| A-1 | 57 | 40 | 1.8 | 1.1 | 200 | 180 |
| A-2 | 56 | 36 | 1.7 | 1.0 | 203 | 175 |
| B-1 | 58 | 43 | 1.6 | 1.1 | 189 | 168 |
| B-2 | 53 | 37 | 1.6 | 1.0 | 186 | 181 |
| C | 58 | 38 | 1.7 | 1.0 | 197 | 171 |
| D | 56 | 37 | 1.6 | 0.9 | 195 | 171 |
| Untreated control | 63 | 39 | 1.6 | 1.0 | 161 | 142 |

It is apparent that the treatment, believed to have formed a cellulose derivative of the structure:

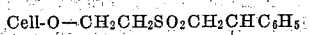

|  | Percent OWB | | Percent WPU | Reacted for 3 minutes, temp., °C. | Tensile strength, lb. (1-inch strip) | | Tear strength, lb. (Elmendorf) | | Crease recovery angle degrees (W + F) | |
|---|---|---|---|---|---|---|---|---|---|---|
|  | Reagent | KHCO$_3$ | | | W | F | W | F | Dry | Wet |
| Sample: | | | | | | | | | | |
| A-1 | 20 | 6.0 | 96 | 150 | 43 | 29 | 1.2 | 0.7 | 203 | 232 |
| A-2 | 20 | 6.0 | 96 | 163 | 43 | 29 | 1.2 | 0.7 | 207 | 214 |
| B-1 | 20 | 11.9 | 100 | 150 | 39 | 28 | 1.3 | 0.7 | 193 | 214 |
| B-2 | 20 | 11.9 | 100 | 163 | 43 | 30 | 1.2 | 0.7 | 201 | 195 |
| C | None | 11.9 | 100 | 163 | 60 | 40 | 1.5 | 0.9 | 170 | 151 |
| Untreated control | | | | | 62 | 39 | 1.6 | 1.0 | 161 | 142 |

Portions of Samples A-1 and B-1 were padded with a 5% solution of sodium carbonate, dried, and then pleated and cured for 5 minutes at 175° C. to complete the second reaction step. The pleated samples showed excellent crease retention after laundering.

EXAMPLE 8

Modification of cellulose by alpha - [(2 - hydroxyethylsulfonyl)methyl] - benzyl alcohol; 2 - step padding procedure Samples of plain-weave cotton fabric (80 x 80 print cloth) were conditioned, weighed, and padded by following, in principle, the procedure of Example 6, except that a 2-step padding operation was used because the solubility of the reagent was too unlike that of potassium bicarbonate. First, the fabric samples were pre-padded with potassium bicarbonate dissolved in water, quantitative details of which are tabulated below. After the fabric samples had been dried at 60° C. on frames, the reagent (the product of Example 3), dissolved in p-dioxane, was applied by padding in accordance with details shown in the following table of treatment data.

After the first reaction step, samples were washed, re-dried on frames, conditioned, weighed, and tested as in Example 7.

The following table gives results of the evaluation.

did not significantly alter the fabric properties. However, crosslinking was effected and crease recovery was greatly enhanced when the side-chain-substituted samples described above were further reacted in a second reaction step by heating at 175° C. for 5 minutes in the presence of a catalytic amount of sodium hydroxide.

I claim:
1. A method for the stepwise chemical modification of a cellulosic textile material which comprises a first reaction step of applying to said cellulosic textile material an unsymmetrical difunctional sulfone represented by the structural formula:

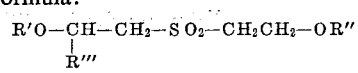

wherein R′ and R″ are hydrogen, alkyl from 1 to 5 carbon atoms, or aliphatic carbon acyl groups containing from 2 to 5 carbon atoms, and R‴ is alkyl from 1 to 20 carbon atoms, monochlorine substituted alkyl from 1 to 5 carbon atoms, monobromine substituted alkyl from 1 to 5 carbon atoms, or phenyl reacting the sulfone with the textile material in the presence of an alkaline catalyst for the reaction

|  | Potassium bicarbonate, percent (from water) | | | Reagent, percent (from p-dioxane) | | | Equivalent of base per 1 equivalent of reagent | Reacted for 3 minutes temp., °C. |
|---|---|---|---|---|---|---|---|---|
|  | OWB | WPU | OWF | OWB | WPU | OWF | | |
| Sample: | | | | | | | | |
| A-1 | 10 | 97 | 9.7 | 21 | 95 | 20.0 | 0.5 | 150 |
| A-2 | 10 | 99 | 9.9 | 21 | 100 | 21.0 | 0.5 | 163 |
| B-1 | 20 | 112 | 22.4 | 25 | 114 | 28.5 | 1.0 | 150 |
| B-2 | 20 | 112 | 22.4 | 25 | 110 | 27.5 | 1.0 | 163 |
| C | 5 | 93 | 4.6 | 12 | 95 | 11.4 | 0.5 | 631 |
| D | 10 | 97 | 9.7 | 12 | 95 | 11.4 | 1.0 | 136 | under one set of reaction conditions to thereby attach one functional group of the sulfone to the textile material by the formation of chemical bonds, imparting a desired configuration to the cellulosic textile material, and thereafter reacting the remaining functional group of the sulfone with the textile material in the presence of alkaline catalyst under different reaction conditions to produce a crosslinked chemically modified cellulosic textile material.

2. A method as defined in claim 1 wherein the first reaction step is carried out at a temperature of 80° to 165° C. in the presence of a base catalyst and the second reaction step is carried out at a temperature of 165° C. to 200° C. in the presence of a base catalyst.

3. A method as defined in claim 1 wherein the cellulosic textile material is in the form of fabric in the first reaction step and is thereafter cut, sewn and manufactured into a finished garment and then has at least one crease formed therein and is subjected to the second reaction step while maintaining said at least one crease in the garment to permanently set the crease in said garment.

4. A method as defined in claim 1 wherein the sulfone is applied to the cellulosic textile material while said material is in the form of a yarn.

5. A method for the stepwise chemical modification of a cellulosic textile material which comprises a first reaction step of applying an aqueous medium containing an unsymmetrical sulfone compound to the cellulosic textile material, said sulfone represented by the structural formula:

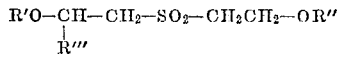

wherein R' and R'' are hydrogen, alkyl from 1 to 5 carbon atoms, or aliphatic carbon acyl groups containing from 2 to 5 carbon atoms, and R''' is alkyl from 1 to 20 carbons atoms, monochlorine substituted alkyl from 1 to 5 carbon atoms, monobromine substituted alkyl from 1 to 5 carbon atoms, or phenyl and reacting said sulfone with the textile material in the presence of an alkaline catalyst at a temperature whereby one functional group of the sulfone reacts with the hydroxyl groups of the cellulosic molecule to form chemical bonds, imparting a desired configuration to the cellulosic textile material and thereafter under different reaction conditions reacting the remaining functional group of the sulfone with the textile material in the presence of alkaline catalyst to produce a crosslinked chemically modified-cellulosic textile material.

6. A chemically modified cellulosic textile material produced by the process of claim 1.

7. A garment made from cellulosic textile produced by the process of claim 3.

References Cited

UNITED STATES PATENTS 3,301,631   1/1967   Mauldin _____ 8—120X
3,312,522   4/1967   Adams et al. _____ 8—120

FOREIGN PATENTS 936,479   9/1963   Great Britain _____ 8—120
651,303   10/1962   Canada _____ 8—120

OTHER REFERENCES

Tesoro et al., Textile Research Journal, vol. 33, pp. 93–107 (1963) 8-sulfone.

GEORGE F. LESMES, Primary Examiner

J. CANNON, Assistant Examiner

U.S. Cl. X.R.

2—243; 8—73, 115.7; 38—144; 260—348.6, 607